United States Patent
Barbu et al.

(10) Patent No.: US 7,488,155 B2
(45) Date of Patent: Feb. 10, 2009

(54) METHOD AND APPARATUS FOR WIND TURBINE BRAKING

(75) Inventors: Corneliu Barbu, Laguna Hills, CA (US); Ralph Teichmann, Nishkayuna, NY (US); Aaron Avagliano, Houston, TX (US); Leonardo Cesar Kammer, Niskayuna, NY (US); Kirk Gee Pierce, Simpsonville, SC (US); David Samuel Pesetsky, Greenville, SC (US); Peter Gauchel, Muenster (DE)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 11/282,127

(22) Filed: Nov. 18, 2005

(65) Prior Publication Data
US 2007/0116572 A1    May 24, 2007

(51) Int. Cl.
F03D 7/04 (2006.01)
(52) U.S. Cl. .............................. 416/1; 416/31; 416/155
(58) Field of Classification Search .................. 415/1, 415/123; 416/1, 146 R, 155; 290/44, 55
See application file for complete search history.

(56) References Cited

U.S. PATENT DOCUMENTS

| | | | |
|---|---|---|---|
| 4,355,955 A | 10/1982 | Kisovec | |
| 4,357,542 A | 11/1982 | Kirschbaum | |
| 4,435,646 A | 3/1984 | Coleman et al. | |
| 4,462,753 A * | 7/1984 | Harner et al. | 416/48 |
| 4,490,093 A | 12/1984 | Chertok et al. | |
| 4,503,673 A * | 3/1985 | Schachle et al. | 60/398 |
| 4,565,929 A | 1/1986 | Baskin et al. | |
| 4,578,019 A | 3/1986 | Safarik | |
| 4,656,362 A | 4/1987 | Harner et al. | |
| 4,671,737 A | 6/1987 | Whitehouse | |
| 4,703,189 A | 10/1987 | DiValentin et al. | |
| 5,422,826 A * | 6/1995 | Cousineau | 700/287 |
| 5,652,485 A | 7/1997 | Spiegel et al. | |
| 5,685,694 A | 11/1997 | Jones et al. | |
| 5,907,192 A | 5/1999 | Lyons et al. | |
| 6,940,185 B2 * | 9/2005 | Andersen et al. | 290/44 |
| 7,126,236 B2 * | 10/2006 | Harbourt et al. | 290/44 |

FOREIGN PATENT DOCUMENTS

GB    2117933 A    10/1983

OTHER PUBLICATIONS

European Search Report for EP06254721; dated Mar. 5, 2008; 47 pages.
"Vestas V82 and V90 Wind Turbine Specifications, and the Vestas V100 Wind Turbine Product Brochure"; Technical Sales Documents Vestas; 2004; pp. 1-36.
Ueda Y et al; "Development of next generation 2MW class large wind turbines"; Mitsubishi Heavy Industries Technical Review; Oct. 2004; pp. 1-4; vol. 41, No. 5.

* cited by examiner

*Primary Examiner*—Ninh H Nguyen
(74) *Attorney, Agent, or Firm*—Armstrong Teasdale LLP (57) ABSTRACT

A method for braking a wind turbine including at least one rotor blade coupled to a rotor. The method includes selectively controlling an angle of pitch of the at least one rotor blade with respect to a wind direction based on a design parameter of a component of the wind turbine to facilitate reducing a force induced into the wind turbine component as a result of braking.

18 Claims, 5 Drawing Sheets

METHOD AND APPARATUS FOR WIND TURBINE BRAKING

The U.S. Government has certain rights in this invention as provided for by the terms of Contract No. DE-AC36-98GO10337 awarded by the Department of Energy/National Renewable Energy Laboratory Division.

BACKGROUND OF THE INVENTION

This invention relates generally to wind turbines, and more specifically to methods and apparatus for wind turbine braking.

At least some known wind turbines may include redundant braking systems to satisfy safety requirements. For example, at least some known wind turbines include a disk brake to facilitate stopping a wind turbine rotor against full wind torque, and a stored energy source, such as hydraulic accumulators, stored spring energy, capacitors, and/or batteries, to enable braking during a power failure. Moreover, at least some known wind turbines also include a braking system that aerodynamically brakes the rotor by pitching the rotor blades into a feathered position. Such braking systems may also include a stored energy source to enable the rotor blades to be pitched during a power failure. However, pitching the rotor blades into a feathered position to aerodynamically brake the rotor may induce vibrational stresses or other forces into the wind turbine and/or its associated components, such as a tower, that may damage such components and/or cause such components to fail. Moreover, at least some known wind turbines pitch the rotor blades into the feathered position at a constant rate that facilitates decreasing rotor speed as quickly as possible. However, such a constant rate of change of the pitch angle may increase an amount or severity of such vibrational stresses or other forces induced into the wind turbine and/or its associated components.

BRIEF DESCRIPTION OF THE INVENTION

In one aspect, a method is provided for braking a wind turbine including at least one rotor blade coupled to a rotor. The method includes selectively controlling an angle of pitch of the at least one rotor blade with respect to a wind direction based at least in part on a design parameter of a component of the wind turbine to facilitate reducing a force induced into the wind turbine component as a result of braking.

In another aspect, a wind turbine braking system that is configured to couple to a power grid includes a rotor including at least one rotor blade, a blade pitch actuator, and a processor coupled to the blade pitch actuator. The processor is configured to selectively control an angle of pitch of the at least one rotor blade with respect to a wind direction based at least in part on a design parameter of a component of the wind turbine to facilitate reducing a force induced to the wind turbine component.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
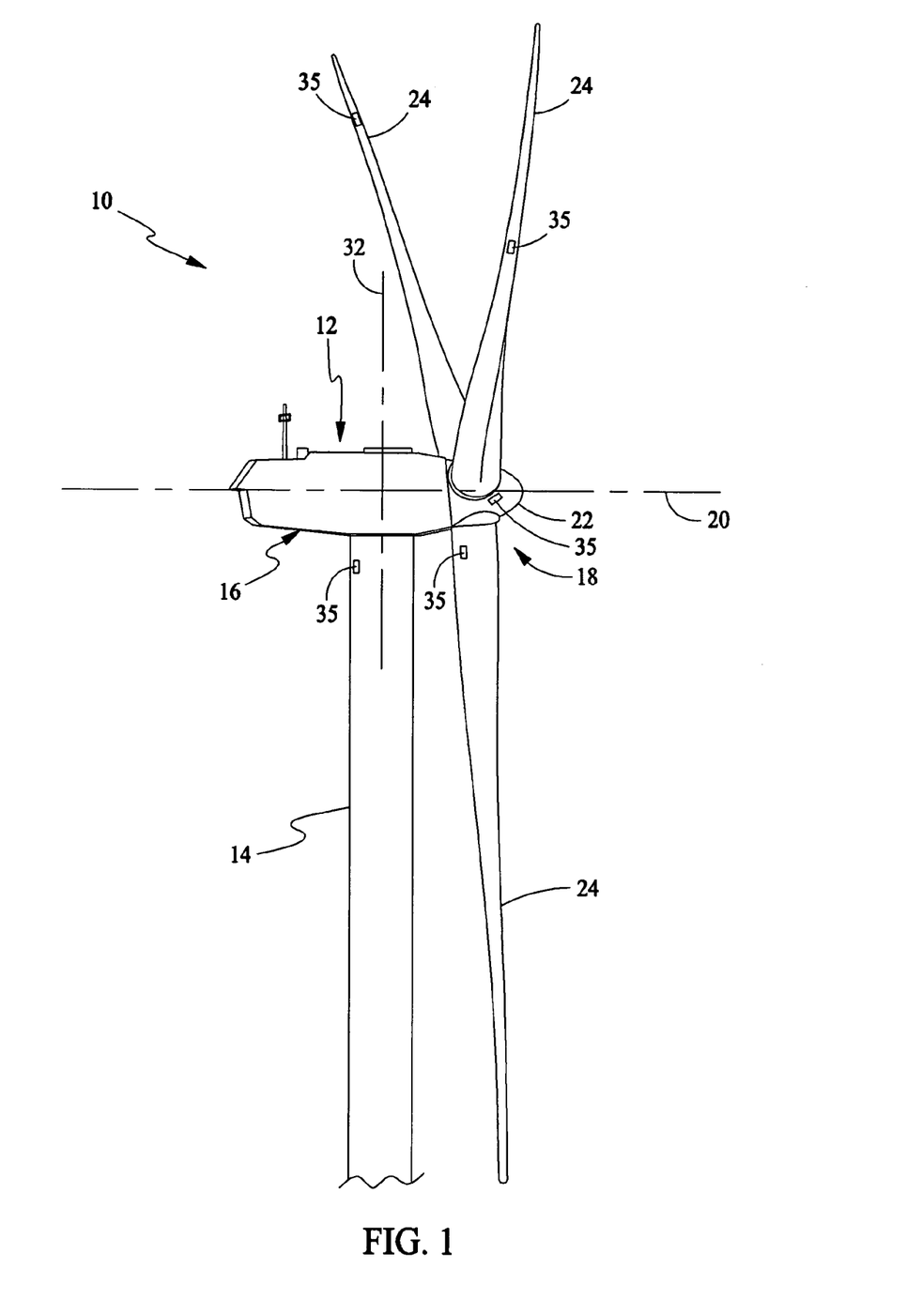
FIG. 1 is a perspective of an exemplary embodiment of an exemplary wind turbine.
Figure 2:
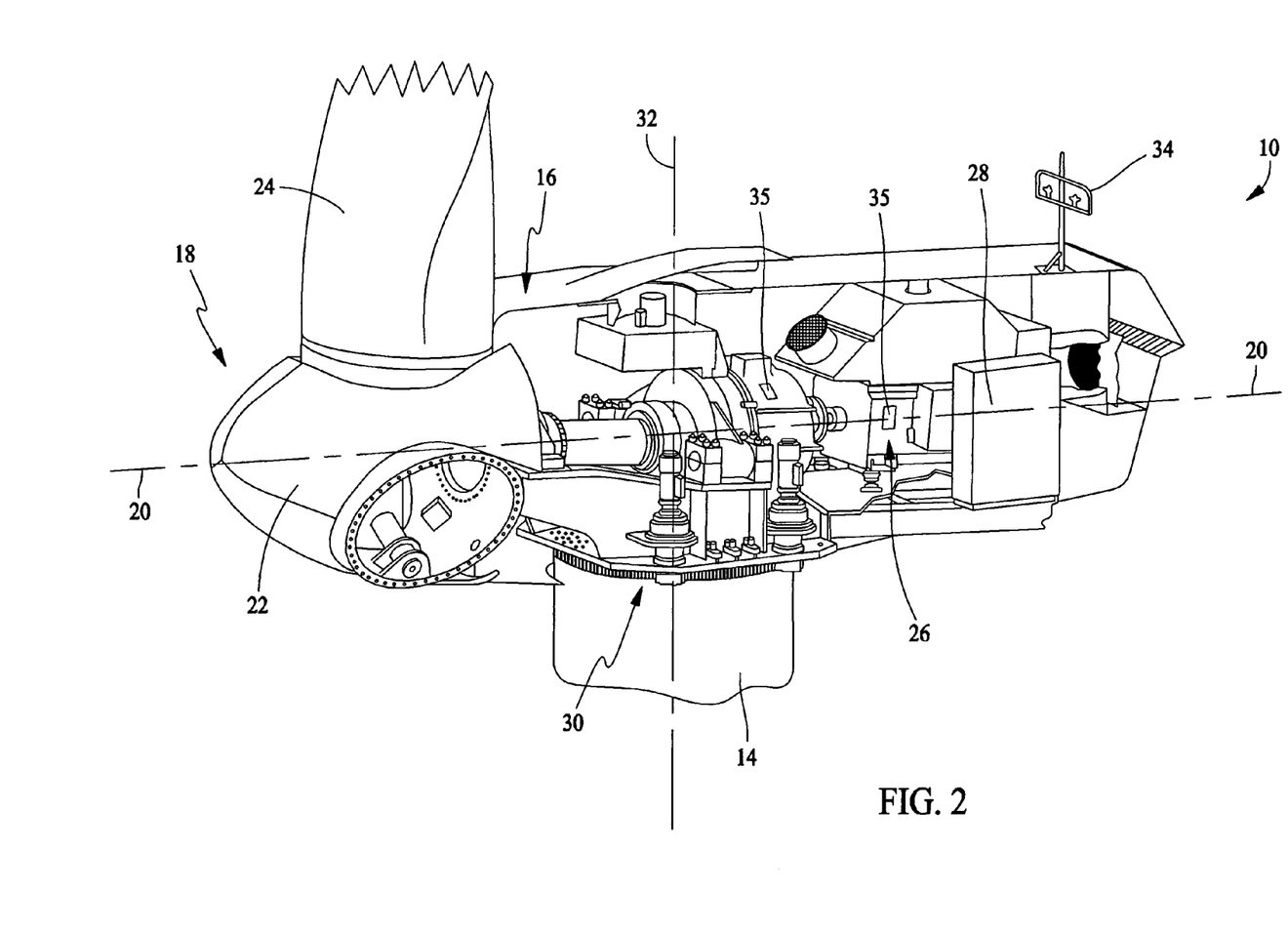
FIG. 2 is a partially cut-away perspective view of a portion of the wind turbine shown in FIG. 1.

FIG. 1 is a perspective of an exemplary embodiment of an exemplary wind turbine 10. FIG. 2 is a partially cut-away perspective view of a portion of wind turbine 10. Wind turbine 10 described and illustrated herein includes a wind generator 12 for generating electrical power from wind energy. However, in some embodiments, wind turbine 10 may include, in addition or alternative to wind generator 12, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1 and 2, in some embodiments a plurality of wind turbines 10 may be grouped together, sometimes referred to as a "wind farm".

In some embodiments, wind generator 12 is mounted on a tower 14, however, in some embodiments wind turbine 10 includes, in addition or alternative to tower-mounted wind generator 12, a wind generator (and/or other type of wind turbine) adjacent the ground and/or a surface of water. The height of tower 14 may be selected based upon factors and conditions known in the art. Wind generator 12 includes a body 16, sometimes referred to as a "nacelle", and a rotor (generally designated by 18) coupled to body 16 for rotation with respect to body 16 about an axis of rotation 20. Rotor 18 includes a hub 22 and a plurality of blades 24 (sometimes referred to as "airfoils") extending radially outwardly from hub 22 for converting wind energy into rotational energy. Although rotor 18 is described and illustrated herein as having three blades 24, rotor 18 may have any number of blades 24. Blades 24 may each have any length (whether described herein). For example, in some embodiments one or more rotor blades 24 are about 0.5 meters long, while in some embodiments one or more rotor blades 24 are about 50 meters long. Other examples of blade 24 lengths include 10 meters or less, about 20 meters, about 37 meters, and about 40 meters. Still other examples include rotor blades between about 50 and about 100 meters long.

Despite how rotor blades 24 are illustrated in FIG. 1, rotor 18 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Wind generator 12 includes an electrical generator 26 coupled to rotor 18 for generating electrical power from the rotational energy generated by rotor 18. Generator 26 may be any suitable type of electrical generator, such as, but not limited to, a wound rotor induction generator. General operation of the electrical generator to generate electrical power from the rotational energy of rotor 18 is known in the art and therefore will not be described in more detail herein. In some embodiments, wind turbine 10 may include one or more control systems 28 coupled to some or all of the components of wind generator 12 for generally controlling operation of wind generator 12 and/or as some or all of the components thereof (whether such components are described and/or illustrated herein). In the exemplary embodiment, control system(s) 28 is mounted on wind generator 12. However, additionally or alternatively, one or more control systems 28 may be remote from wind generator 12 and/or other components of wind turbine 10. Control system(s) 28 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind generator 12 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind generator 12 may include a yaw system 30 for rotating wind generator 12 about an axis of rotation 32 for changing a yaw of rotor 18, and more specifically for changing a direction faced by rotor 18 to, for example, adjust an angle between the direction faced by rotor 18 and a direction of wind. Yaw system 30 may be coupled to control system(s) 28 for control thereby. In some embodiments the wind generator 12 may include an anemometer 34 for measuring wind speed and/or wind direction. Anemometer 34, in some embodiments, may be coupled to control system(s) 28 for sending measurements to control system(s) 28 for processing thereof. For example, and although anemometer 34 may be coupled to control system(s) 28 for sending measurements thereto for controlling other operations of wind turbine 10, anemometer 34 may send measurements to control system(s) 28 for controlling and/or changing a yaw of rotor 18 using yaw system 30. Alternatively, anemometer 34 may be coupled directly to yaw system 30 for controlling and/or changing a yaw of rotor 18. Wind turbine 10 may also include one or more other sensors 35 coupled to one or more components of wind farm 10 and/or the power grid, whether such component(s) are described or illustrated herein, for measuring parameters of such component(s). Sensor(s) 35 may include, but are not limited to, sensors configured to measure displacements, yaw, pitch, moments, strain, stress, twist, damage, failure, rotor torque, rotor speed, a grid anomaly in the power grid, and/or an anomaly of power supplied to any component of wind turbine 10. Although exemplary sensors 35 are illustrated herein as coupled to various components of wind turbine 10, for example tower 14, blades 24 and hub 22, the sensors 35 illustrated herein are not limited to the components each sensor is shown as coupled to, nor the location shown on such components. Rather, sensor(s) 35 may couple to any component of wind turbine 10 and/or the power grid at any location thereof for measuring any parameter thereof, whether such component, location, and/or parameter is described and/or illustrated herein. General operation of wind turbine 10, and more specifically wind generator 12, is known in the art and therefore will not be described in more detail herein.

Wind generator 12 includes a variable blade pitch system 36 for selectively controlling, including but not limited to changing, a pitch angle of rotor blades 24 with respect to a wind direction. Pitch system 36 may be coupled to control system(s) 28 for control thereby. In some embodiments, the pitch angles of blades 24 are individually controlled by pitch system 36. Pitch system 36 includes one or more actuators 38 coupled to hub 22 and blades 24 for changing the pitch angle of blades 24 by rotating blades 24 with respect to hub 22. Actuators 38 may include any suitable structure, configuration, arrangement, means, and/or components, whether described and/or illustrated herein, such as, but not limited to, electrical motors, hydraulic cylinders, springs, and/or servo-mechansims. Moreover, actuators 38 may be driven by any suitable means, whether described and/or illustrated herein, such as, but not limited to, hydraulic fluid, electrical power, electro-chemical power, and/or mechanical power, such as, but not limited to, spring force. Additionally or alternatively, actuators 38 may be driven by energy extracted from rotational inertia of rotor 18 and/or a stored energy source (not shown) that supplies components of wind turbine 10, such as, but not limited to, control system(s) 28 and/or pitch system 36, energy during a grid anomaly in the power grid coupled to wind turbine 10. For example, a grid anomaly in the utility power grid may include, but is not limited to, a power failure, an undervoltage condition, an overvoltage condition, and/or an out-of-frequency condition. As such, the stored energy source enables pitching of blades 24 during the grid anomaly. Although other stored energy sources may be used, in some embodiments the stored energy source includes hydraulic accumulators, electrical generators, stored spring energy, capacitors, and/or batteries. The stored energy sources may be located anywhere within, on, adjacent to, and/or remote from wind turbine 10. In some embodiments, the stored energy source stores energy extracted from rotational inertia of rotor 18, energy stored within a converter (not shown) of wind turbine 10, and/or other auxiliary energy sources such as, but not limited to, an auxiliary wind turbine (not shown) coupled to wind turbine 20, solar panels, and/or hydro-power installations.

Figure 3:
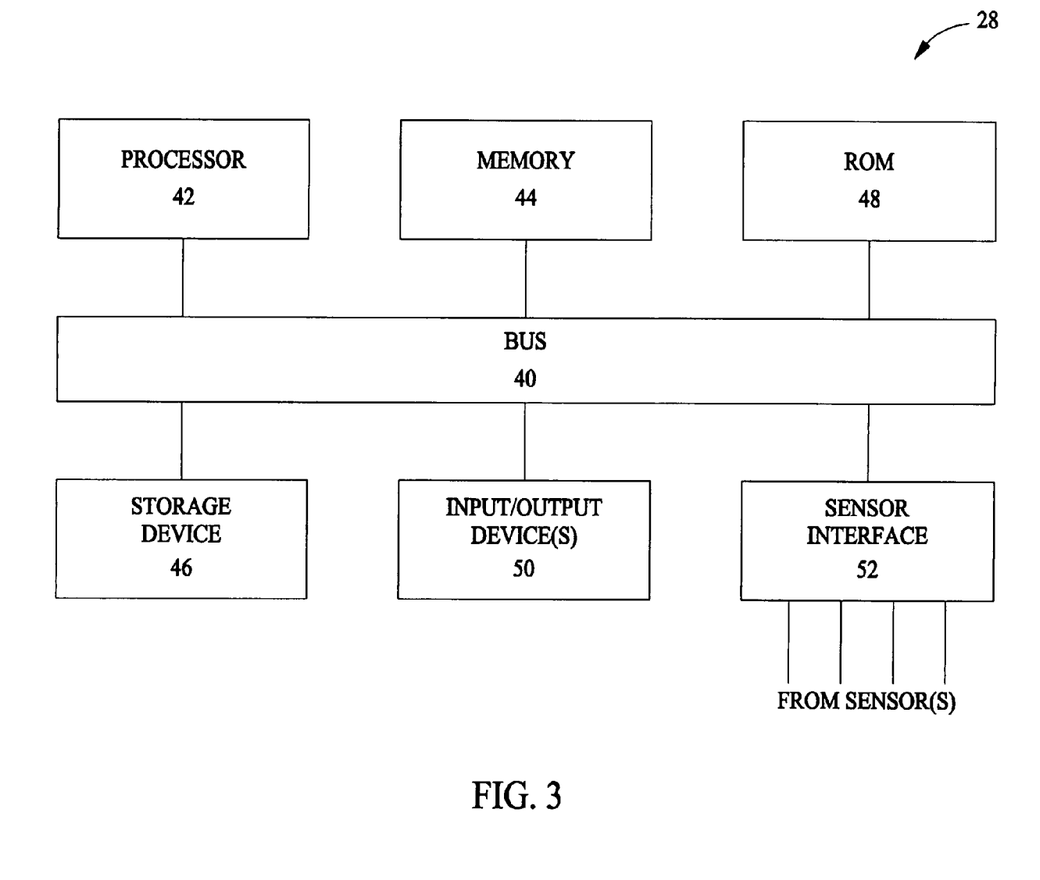
FIG. 3 is a block diagram of an exemplary embodiment of a control system for the wind turbine shown in FIGS. 1 and 2.

FIG. 3 is a block diagram of an exemplary embodiment of control system(s) 28. In some embodiments, control system(s) 28 include a bus 40 or other communications device to communicate information. One or more processor(s) 42 are coupled to bus 40 to process information, including information from anemometer 34 and/or sensors 35. Control system(s) 28 may also include one or more random access memories (RAM) 44 and/or other storage device(s) 46. RAM(s) 44 and storage device(s) 46 are coupled to bus 40 to store and transfer information and instructions to be executed by processor(s) 42. RAM(s) 44 (and/or also storage device(s) 46, if included) can also be used to store temporary variables or other intermediate information during execution of instructions by processor(s) 42. Control system(s) 28 may also include one or more read only memories (ROM) 48 and/or other static storage devices coupled to bus 40 to store and provide static (i.e., non-changing) information and instructions to processor(s) 42. Input/output device(s) 50 may include any device known in the art to provide input data to control system(s) 28 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 28 may also include a sensor interface 52 that allows control system(s) 28 to communicate with anemometer 34 and/or sensors 35. Sensor interface 52 can be or can include, for example, one or more analog-to-digital converters that convert analog signals into digital signals that can be used by processor(s) 48.

Figure 4:
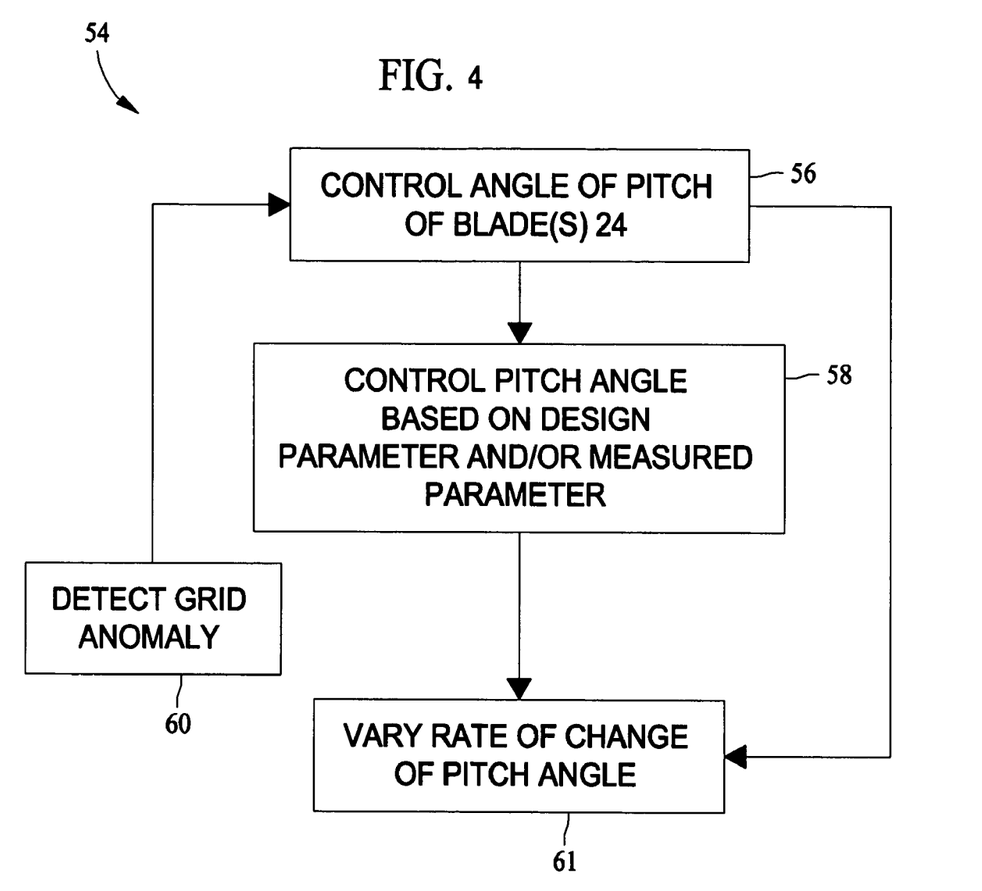
FIG. 4 is a flowchart illustrating an exemplary embodiment of a method for braking the wind turbine shown in FIGS. 1 and 2.

FIG. 4 is a flowchart illustrating an exemplary embodiment of a method 54 for braking wind turbine 10. Method 54 includes selectively controlling 56 an angle of pitch of one or more rotor blades 24 for example, using control system(s) 28 and/or pitch system 36. For example, selectively controlling 56 the pitch angle of blade(s) 24 may include, but is not limited to, selecting the angle of pitch of blade(s) 24, changing the pitch angle of blade(s) 24, and/or controlling a rate at which the pitch angle of blade(s) 24 is changed. Some pitch angles and/or changes of pitch angle may induce vibrational stresses and/or other forces into components of wind turbine 10 (whether such components are described and/or illustrated herein), possibly resulting in damage to and/or failure of such components. For example, some pitch angles and/or changes of pitch angle may generate an imbalance of pitch angles between blades 24 that may damage and/or cause blades 24 and/or other components of wind turbine 10 to fail. Another example includes bending moments in tower 14 that damage tower 14 and/or cause tower 14 to fail caused by some pitch angles and/or changes of pitch angle. Moreover, some pitch angles and/or changes of pitch angle may induce loads that cause damage to and/or failure of components of wind turbine 10 such as, but not limited to, blades 24, hub 22, an interconnection between tower 14 and wind generator 12, a bedplate (not shown) of tower 14, a foundation (not shown) of wind turbine 10, a gearbox of wind turbine 10, a bearing of wind turbine 10, and/or a drivetrain of wind turbine 10.

Accordingly, in some embodiments method 54 includes selectively controlling 58 the pitch angle of blade(s) 24 based, at least in part, on a design parameter of one or more components of wind turbine 10 and/or the power grid, and/or based, at least in part, on a parameter of one or more components of wind turbine 10 and/or the power grid measured by anemometer 34 and/or one or more of sensors 35. Accordingly, control of the pitch angle of blade(s) 24 can be selected to facilitate reducing or eliminating vibrational stresses and/or other forces induced into one or more predetermined components of wind turbine 10. For example, a pitch angle of blade(s) 24, a change in the pitch angle of blade(s) 24, and/or a rate of change of the pitch angle of blade(s) 24 may be selected to reduce or eliminate vibrational stresses and/or other forces induced into one or more components of wind turbine 10. Design parameters of one or more components of wind turbine 10 may include, but are not limited to, a size, shape, stiffness, tension, compression, and/or strength of the component, including any factors of safety. Parameters of one or more components of wind turbine 10 measured by anemometer 34 and/or sensors 35 may include, but are not limited to, displacements, yaw, angle of pitch, moments, wind speed, wind direction, strain, stress, twist, damage, failure, rotor torque, and/or rotor speed.

As described above, in some embodiments controlling 56 the pitch angle of blade(s) 24 includes changing the pitch angle blade(s) 24. In some embodiments, the pitch angle of blade(s) 24 is changed to aerodynamically brake rotor 18. More specifically, blade(s) 24 are changed from a first position that is angled with respect to a wind direction such that wind drives rotation of rotor 18, to a second position, sometimes referred to as a "feathered position", that is angled with respect to the wind direction such that wind slows rotation of rotor 18. Accordingly, changing 56 the pitch angle of rotor blade(s) 24 from the first position to the second position facilitates aerodynamically braking rotor 18. Although the first position may include other pitch angles, in some embodiments blade(s) 24 are angled with respect to a wind direction at between about −5° and about 5°. Moreover, although the second position may include other pitch angles, in some embodiments blade(s) 24 are angled with respect to a wind direction at between about 85° and about 95°. In some embodiments, and for example, when control system(s) 28 detects 60 a grid anomaly in the power grid, control system(s) 28 may command pitch system 36 to change a pitch angle of rotor blade(s) 24 to thereby aerodynamically brake rotor 18 in response to the grid anomaly. In the event of a grid anomaly, energy may be extracted from the stored energy source and supplied to control system(s) 28 and/or pitch system 36 for operation thereof.

To further facilitate reducing or eliminating vibrational stresses and/or other forces induced into one or more components of wind turbine 10, and as described above, in some embodiments method 56 includes varying 61 a rate of change of the pitch angle of rotor blade(s) 24. For example, in some embodiments the rate of change of the pitch angle of blade(s) 24 is varied 61 as blade(s) 24 are moved between the first position and the second position to aerodynamically brake rotor 18. The variance in the rate of change, including but not limited to the time for each particular rate of change, may be based, at least in part, on a design parameter of one or more components of wind turbine 10 and/or the power grid, and/or based, at least in part, on a parameter of one or more components of wind turbine 10 and/or the power grid measured by anemometer 34 and/or one or more of sensors 35. Accordingly, the variance in the rate of change, including but not limited to the time for each particular rate of change, may be selected to facilitate reducing or eliminating vibrational stresses and/or other forces induced into one or more predetermined components of wind turbine 10. For example, the variance in the rate of change may facilitate reducing and/or eliminating blade pitch imbalance and/or effect thereof.

Figure 5:
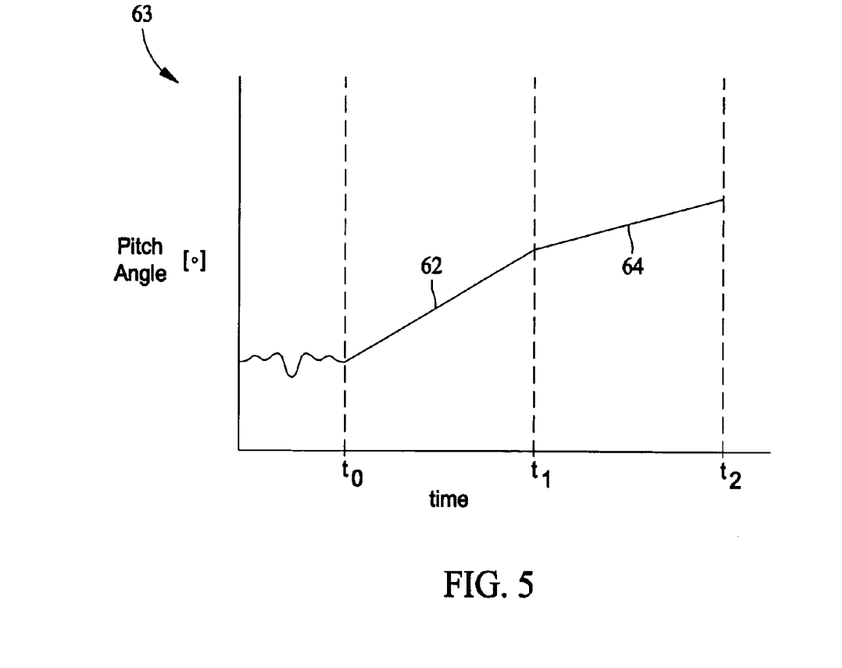
FIG. 5 is a graph illustrating an example of a portion of the method shown in FIG. 4.
Figure 6:
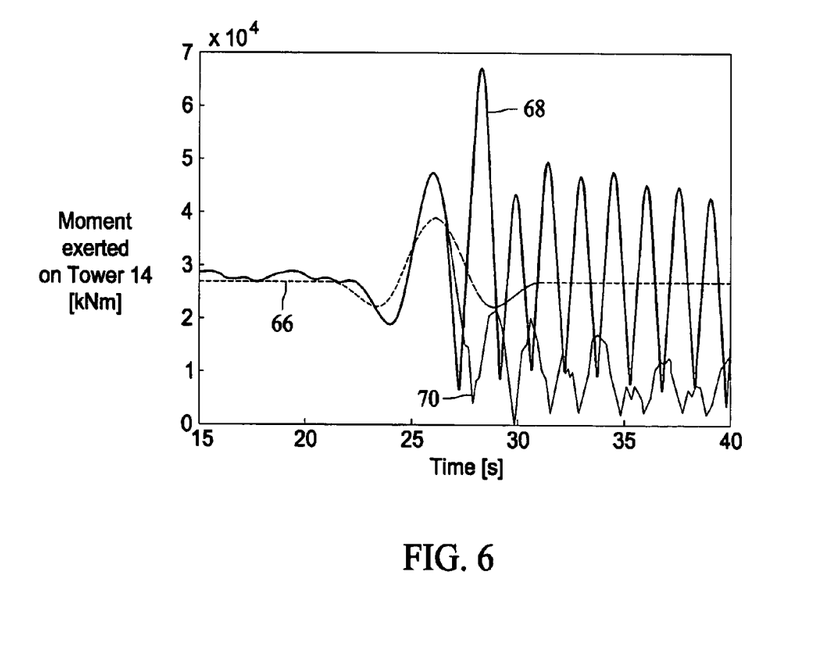
FIG. 6 is a graph illustrating exemplary data representative of a difference between wind speed and various moments exerted on a tower of the wind turbine shown in FIGS. 1 and 2.

FIG. 5 is a graph 63 illustrating one example of varying 61 the rate of change of the pitch angle of blade(s) 24. In the exemplary embodiment of FIG. 5, blade(s) 24 are pitched from a first position to the second position to aerodynamically brake rotor 18. As blade(s) 24 are pitched from the first position to the second position, the pitch angle is changed at a first rate 62 and is thereafter changed at a second rate 64 that is less than first rate 62. More specifically, and for example, when control system(s) 28 detects a grid anomaly in the utility grid at about time $t_0$, control system(s) 28 command pitch system 36 to move the pitch angle of one or more blade(s) 24 from the first position toward the second position at first rate 62. Once rotation of rotor 18 has been slowed by a predetermined amount, control system(s) 28 command pitch system 36 at time $t_1$ to move the pitch angle of blade(s) 24 at second rate 64 until blade(s) 24 are in the second position at $t_2$. In some embodiments first rate 62 facilitates reducing a speed and/or torque of rotor 18 as quickly as possible, while reduced second rate 64 facilitates reducing or eliminating vibrational stresses and/or other forces induced into one or more components of wind turbine 10. For example, second rate 64 may facilitate damping oscillation of tower 14. FIG. 6 is a graph illustrating exemplary data representative of the reduction of a moment exerted on tower 14 using the variance of the change of the pitch angle of blade(s) 24 shown in FIG. 5. More specifically, FIG. 6 illustrates a difference between a wind speed 66, a moment 68 exerted on tower 14 using a constant rate of change of the pitch angle of blade(s) 24, and a moment 70 exerted on tower 14 using the variance of the change of pitch angle of blade(s) 24 shown in FIG. 5.

The above-described and/or illustrated methods and systems are cost-effective and efficient for braking wind turbines. More specifically, by selectively controlling an angle of pitch of one or more rotor blades based, at least in part, on at least one of a determined design parameter and a measured parameter of one or more components of the wind turbine, the methods and systems described and/or illustrated herein facilitate reducing or eliminating forces induced into the wind turbine component(s). Moreover, the methods and systems described and/or illustrated herein may facilitate reducing or eliminating forces induced into the wind turbine component(s) by varying a rate of change of the pitch angle of the rotor blade(s) during braking of the wind turbine rotor. Accordingly, the methods and systems described and/or illustrated herein may facilitate reducing damage to and/or failure of wind turbine component(s) while still facilitating efficient braking of the wind turbine rotor. As such, a technical effect of the methods and systems described and/or illustrated herein may include facilitating reducing or eliminating forces induced into the wind turbine component(s) to facilitate reducing damage to and/or failure of the wind turbine component(s) while still facilitating efficient braking of the wind turbine rotor.

Although the systems and methods described and/or illustrated herein are described and/or illustrated with respect to a wind turbine, and more specifically braking a wind generator rotor, practice of the systems and methods described and/or illustrated herein is not limited to wind generators, nor wind turbines generally. Rather, the systems and methods described and/or illustrated herein are applicable to braking any rotor having one or more blades.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the", "said", and "at least one" are intended to mean that there are one or more of the element (s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for braking a wind turbine including at least one rotor blade coupled to a rotor, said method comprising:
   individually controlling an angle of pitch of the al least one rotor blade with respect to a wind direction based at least in part on a design parameter of a component of the wind turbine to facilitate reducing a force induced into the wind turbine component as a result of braking; and
   linearly varying a rate of change of the at least one rotor blade pitch angle.

2. A method in accordance with claim 1 wherein controlling an angle of pitch of the at least one rotor blade comprises changing the pitch angle of the at least one rotor blade.

3. A method in accordance with claim 1 wherein varying a rate of change of the at least one rotor blade pitch angle comprises changing the pitch angle at a first rate and thereafter changing the pitch angle at a second rate that is less than the first rate.

4. A method in accordance with claim 1 wherein varying a rate of change of the at least one rotor blade pitch angle comprises varying a rate of change of the at least one rotor blade pitch angle based on at least one of a design parameter of a component of the wind turbine and a measured parameter of a component of the wind turbine.

5. A method in accordance with claim 1 wherein the wind turbine is coupled to a utility power grid, said method further comprises:
   detecting a grid anomaly in the utility power grid; and
   changing the at least one rotor blade pitch angle in response to the detected grid anomaly in the utility power grid.

6. A method in accordance with claim 5 wherein detecting a grid anomaly in the utility power grid comprises sensing at least one of an undervoltage condition, an overvoltage condition, and an out-of-frequency condition.

7. A method in accordance with claim 5 wherein changing the at least one rotor blade pitch angle in response to the detected grid anomaly comprises changing the at least one rotor blade pitch angle using at least one of energy extracted from rotational inertia of the wind turbine rotor and energy extracted from a stored energy source.

8. A method in accordance with claim 7 further comprising storing energy extracted from rotational inertia of the wind turbine rotor using the stored energy source.

9. A method in accordance with claim 1 wherein controlling an angle of pitch of the at least one rotor blade comprises facilitating aerodynamically braking the wind turbine rotor.

10. A wind turbine system configured to couple to a power grid, said wind turbine comprising:
    a rotor comprising at least one rotor blade;
    a blade pitch actuator; and a processor coupled to said blade pitch actuator, said processor programmed to:

individually control an angle of pitch of the at least one rotor blade with respect to a wind direction based at least in part on a design parameter of a component of the wind turbine to facilitate reducing a force induced into the wind turbine component as a result of braking; and linearly vary a rate of change of the at least one rotor blade pitch angle.

11. A system in accordance with claim 10 wherein said processor is programmed to change the pitch angle of said at least one rotor blade between a first position and a second position with respect to a wind direction using said blade pitch actuator.

12. A system in accordance with claim 11 wherein said processor is programmed to change the pitch angle of said at least one rotor blade in response to a grid anomaly in the power grid.

13. A system in accordance with claim 11 said processor is programmed to aerodynamically brake said rotor by changing the pitch angle of said at least one rotor blade using said blade pitch actuator.

14. A system in accordance with claim 11 wherein said processor is programmed to change the pitch angle of said at least one rotor blade at a first rate and thereafter change the pitch angle of said at least one rotor blade at a second rate that is less than the first rate using said blade pitch actuator.

15. A system in accordance with claim 10 further comprising a stored energy source coupled to said processor and said blade pitch actuator for supplying energy to at least one of said processor and said blade pitch actuator during a grid anomaly in the power grid.

16. A system in accordance with claim 15 wherein said stored energy source comprises at least one of a hydraulic accumulator, an electrical generator, a spring, a capacitor, and a battery.

17. A system in accordance with claim 10 wherein said wind turbine further comprises a sensor coupled to the wind turbine component for measuring a parameter of the wind turbine component.

18. A system in accordance with claim 10 wherein said blade pitch actuator comprises at least one of an electrical motor, a hydraulic cylinder, a spring, and a servomechanism.

* * * * *

UNITED STATES PATENT AND TRADEMARK OFFICE
CERTIFICATE OF CORRECTION

PATENT NO. : 7,488,155 B2 Page 1 of 1
APPLICATION NO. : 11/282127
DATED : February 10, 2009
INVENTOR(S) : Barbu et al.

It is certified that error appears in the above-identified patent and that said Letters Patent is hereby corrected as shown below:

Claim 1, column 8, line 21, delete "the al least" and insert therefor --the at least--.

Signed and Sealed this

Fourteenth Day of April, 2009

JOHN DOLL
*Acting Director of the United States Patent and Trademark Office*